Figure 5:
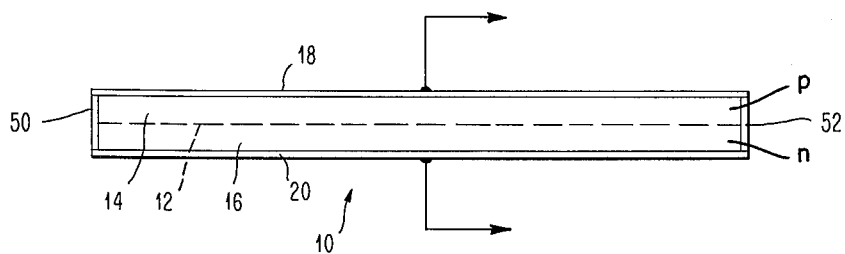

April 26, 1966   F. H. DILL ETAL   3,248,670
SEMICONDUCTOR LASER WITH OPTICAL CAVITY
Filed Oct. 30, 1962   3 Sheets-Sheet 1
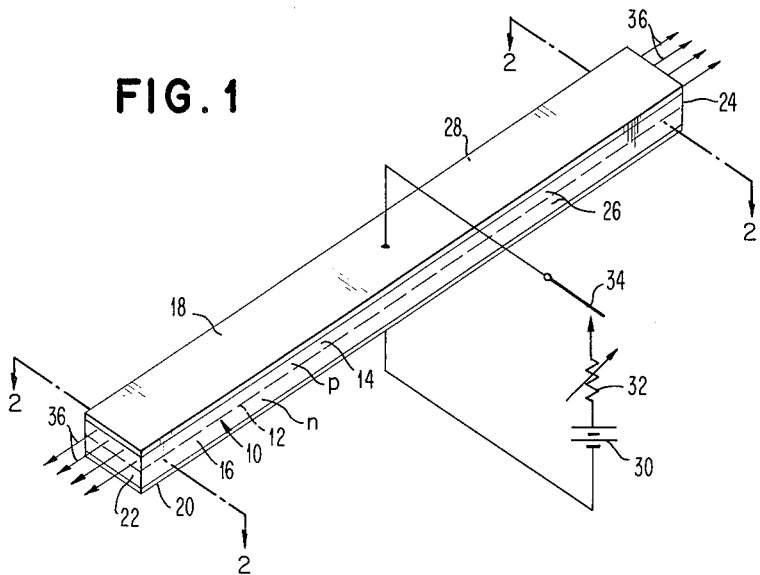
FIG. 1
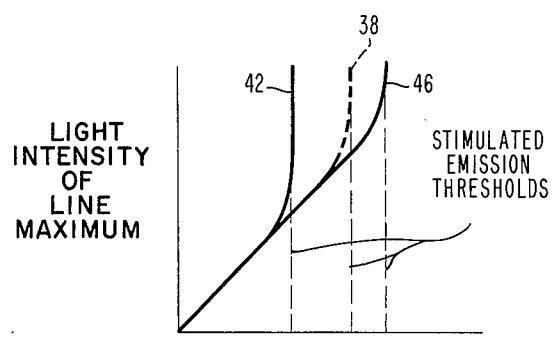
FIG. 2
FIG. 3
LIGHT INTENSITY OF LINE MAXIMUM
STIMULATED EMISSION THRESHOLDS
INJECTED CARRIER CURRENT DENSITY
INVENTORS
FREDERICK H. DILL
WILLIAM P. DUMKE
GORDON J. LASHER
MARSHALL I. NATHAN
BY *Stephen J. Limanek*
ATTORNEY

FIG. 9
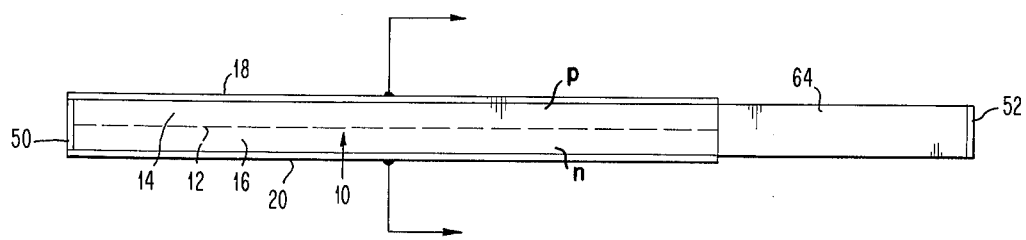
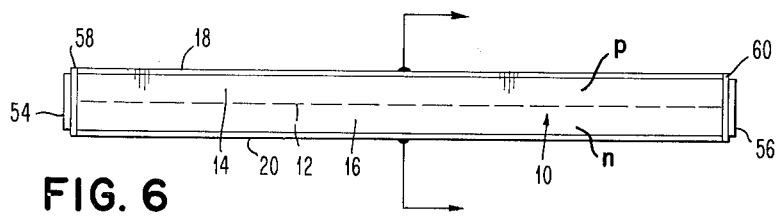
FIG. 6
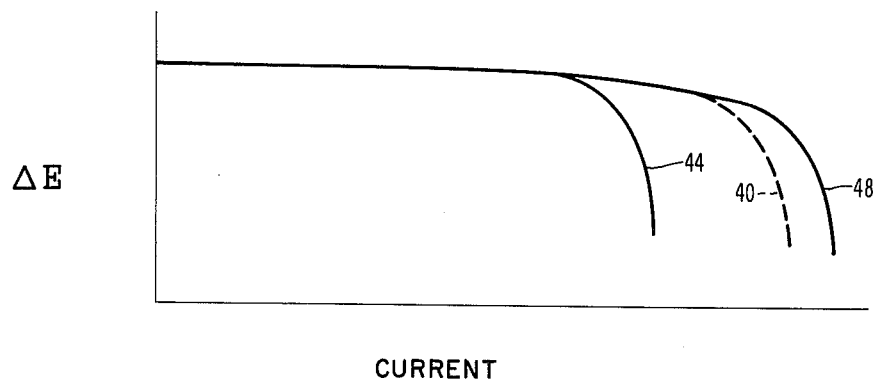
CURRENT
FIG. 4

April 26, 1966  F. H. DILL ETAL  3,248,670
SEMICONDUCTOR LASER WITH OPTICAL CAVITY
Filed Oct. 30, 1962  3 Sheets-Sheet 3

United States Patent Office 3,248,670
Patented Apr. 26, 1966

3,248,670
SEMICONDUCTOR LASER WITH OPTICAL CAVITY
Frederick H. Dill, Putnam Valley, William P. Dumke, Chappaqua, Gordon J. Lasher, Briarcliff Manor, and Marshall I. Nathan, Mount Kisco, N.Y., assignors to International Business Machines Corporation, New York, N.Y., a corporation of New York
Filed Oct. 30, 1962, Ser. No. 234,150
15 Claims. (Cl. 331—94.5)

This invention relates to lasers of the solid state type and more particularly to the stimulated emission of radiation by carrier injection and recombination in a solid state element.

Optical masers or lasers, as the art has developed, generally involve the establishment of an artificial distribution of electrons at energy levels other than the natural distribution in a host environment through the application of a source of energy known as pumping energy. This results in a greater fraction of filled energy states at the higher levels than filled energy states at the lower levels, which condition is known as population inversion. The electrons present in the host environment in the artificial distribution then give up their energy and undergo a transition to a lower energy level. The released energy may be in the form of electromagnetic radiation which in the majority of devices seen thus far in the art has been either visible or infrared electromagnetic radiation.

In optical maser devices currently available in the art there is employed either a gas, such as helium-neon mixture or a crystal, such as, aluminum oxide or calcium fluoride, as the host environment, into which is placed appropriate impurities, for example, chromium or trivalent uranium, respectively, which respond to the pumping energy, permitting the population inversion of electrons between an excited state and a lower state of the impurities. The electrons in returning to the lower state of the impurity give off a quanta of light energy or photons in what is known in the art as radiation transition. When the density of these photons becomes large, the radiative transition probability increases, and in the presence of a population inversion, electromagnetic modes into which the photons are emitted, in turn, become more readily able to induce further emission therein. This is known in the art as stimulated emission of radiation and results in a narrowing of the emission line from the device. In the currently available optical maser device, electrical power is converted to optical power, pumping light or an electrical discharge, which, in turn, is used to establish the population inversion in the host crystal.

It has been discovered that optical laser action or stimulated emission of radiation can be imparted to a suitable solid state material by injecting carriers at a sufficient rate and permitting those carriers to recombine. When this injection carrier rate is achieved, a resulting narrowing of the output light emission line occurrs. Stimulated emission of radiation is imparted to a solid state material which has an energy gap and which exhibits a radiative energy transition upon the release of energy by carrier recombination therein by injecting carriers into the solid state material in a density sufficient to overcome the losses in the solid state environment. More particularly, stimulated emission of radiation has been imparted to a semiconductor device by the fabrication of a "p-n" junction in the device which is appropriately forward biased at a given injected carrier current density sufficiently high to overcome various nonradiative electron recombination and various radiation loss mechanisms in the host semiconductor crystal. When these conditions are satisfied, the light output, as a result of the released energy through recombination of the injected carriers, sharply shifts to a single predominating mode at the expense of all other output modes in the system, as described in more detail in commonly assigned copending U.S. patent application Serial No. 230,607, Burns et al., filed October 15, 1962.

It is an object of this invention to provide stimulated emission of radiation in an improved solid state device.

Another object of this invention is to provide an improved coherent light emitting solid state structure.

A further object of this invention is to provide a solid state structure emitting light in a preferred optical mode.

Yet a further object of this invention is to provide an improved injection laser.

Yet another object of this invention is to provide an improved solid state device exhibiting a sharp narrowing of the emission line width for injected carrier density values having lower threshold density.

Still a further object of this invention is to provide a coherent light emitting semiconductor structure having a geometrical configuration which enhances the emission of a preferred optical mode.

Still another object of this invention is to provide a coherent light emitting semiconductor structure having a lower stimulated emission threshold.

In accordance with the present invention an improved device exhibiting stimulated emission of radiation is provided which includes a semiconductor crystal having two regions of opposite conductivity type joined at a p-n junction plane having dimensions such that the length thereof is substantially longer than the width thereof.

An important advantage of this invention is that an injection laser is provided which has a stimulated emission threshold substantially lower than the threshold of prior injection lasers.

An important feature of the injection laser of the present invention is that it provides highly directional coherent light compared to the output light from prior injection lasers.

The foregoing and other objects, features and advantages of the present invention will be apparent from the following more particular description of preferred embodiments of the invention, as illustrated in the accompanying drawings.

In the drawings:

FIG. 1 is a perspective of a first embodiment of the injection laser of the present invention, FIG. 2 is a section of the laser of FIG. 1 taken through line 2—2, FIG. 3 shows curves of light intensity of line maximum versus injected carrier current density of injection lasers illustrating stimulated emission thresholds, FIG. 4 shows curves illustrating the narrowing of the bandwidth of light output versus current of injection lasers, and FIGS. 5, 6, 7, 8 and 9 illustrate additional embodiments of the injection laser of the present invention.

Referring to the dawings in more detail, there is shown in FIG. 1 a perspective view of one embodiment of the injection laser of the present invention. The device of FIG. 1 is made up of a semiconductor crystal 10 containing a p-n junction 12 separating a "p" region 14 and an "n" region 16. A first electrode or ohmic contact 18 is disposed on the "p" region 14 and a second electrode or ohmic contact 20 is placed into contact with the "n" region 16. The electrodes 18 and 20 are preferably metallic sheets forming plane surfaces mutually parallel and lapped. The device is constructed so as to have the p-n junction plane essentially parallel to the planes of the electrodes 18 and 20 and all adjacent surfaces of the semiconductor 10 are preferably at 90° to each other. The end surfaces 22 and 24 and the side surfaces 26 and 28, thus, are parallel to each other and, preferably, each of the end and side surfaces are optically flat. The electrodes 18 and 20 are appropriately connected to a power source illustrated as a battery 30, a variable series impedance 32 and a switch 34 which serve to selectively apply a forward bias to the p-n junction 12 to provide a current density above the threshold current density of the device illustrated.

FIG. 2 is a top view of a section taken through line 2—2 of FIG. 1 showing the area of the p-n junction equal to the width W and the length L, where L is substantially greater than W, preferably at least about 10 times as great as W.

In the operation of the device illustrated in FIG. 1 of the drawing, when the switch 34 is closed, photons are generated by the injected carriers, as described in the above-identified U.S. patent application. The photons generated travel from their points of origin in a relatively thin light emitting laser along the junction 12 in many different directions to emit light, produced by stimulated emission when current density thresholds are exceeded, from the end and side surfaces 22, 24, 26 and 28 of the semiconductor crystal 10. However, due to the geometry of the junction 12, the optical modes which propagate parallel to the plane of the junction 12 and perpendicular to the optically flat end surfaces 22 and 24 are favored resulting in a highly collimated light indicated at 36, being emitted from the end surfaces 22 and 24. These desired modes become more highly favored as the ratio of L to W becomes large and if the upper and lower and side surfaces are made absorbting or highly transmitting. It should be noted that since the ends 22 and 24 are optically flat, a substantial amount, 30 to 40 percent, of the incident light from the crystal 10 is reflected at these surfaces 22, 24. Thus, a resonant optical cavity is provided in this device wherein standing waves are produced when excited by the radiations generated in the injection laser.

The end surfaces 22 and 24 and the side surfaces 26 and 28 may be made optically flat and parallel to each other by any known process, for example, grinding and polishing, however, it is preferred that these surfaces be made optically flat and parallel to each other by employing the cleavage technique taught in commonly assigned copending U.S. patent application Serial No. 234,141, "Method of Fabricating Crystalline Shapes," filed by R. Rutz and F. Dill on even date. In accordance with the cleavage technique, crystalline shapes having very high precision optically flat faces related to exact geometries and spacing are achieved by supporting the crystal on a broad area crystallographic face that is perpendicular to a crystallographic plane having a minimum bond and then applying a cleavage force to the crystal along the minimum bond crystallographic plane. When a rectangular parallelepiped crystal body of gallium arsenide is to be formed, the gallium arsenide crystal body is supported parallel to the (100) crystallographic plane thereof and a force is applied perpendicular to the (100) crystallographic plane along the (110) crystallographic plane of the gallium arsenide crystal.

It should be understood that the selected mode between two end surfaces 22 and 24 is favored not only because the optically flat end surfaces 22 and 24 form a geometrically resonant optical cavity for this mode, but also because the radiation perpendicular to the end surfaces 22 and 24 have a longer time in which to induce further emission of similar photons as they repeatedly travel between the end surfaces 22 and 24. Hence, it can be seen that this selected mode provides stimulated emission at much lower current density thresholds since most of the energy from the injected carriers will be directed to support this.

The current density thresholds for prior injection lasers and for the lasers of the present invention are indicated in FIG. 3 of the drawing. The curve 38 shown in FIG. 2 is a plot of the light intensity of the emitted light line maximum against injected carrier current density in prior injection lasers. It can be seen that this curve 38 is substantially linear at low current densities but at higher current densities there is an abrupt change in the slope indicating the stimulated emission threshold for the prior injection lasers. It is known that at the threshold there is an abrupt shift in the light intensity to a narrow band of intense light and with a further increase in current the narrow band predominates at the expense of other bands. The narrowing of the band of the prior art injection lasers is indicated in curve 40 of FIG. 4 of the drawing where the emission line width at half height is indicated by $\Delta E$ which is plotted against current. The stimulated emission threshold of prior art injection lasers was achieved at currents of the order of $10^4$ to $10^5$ amperes per square centimeter. By employing the novel arrangements of the present invention the stimulated emission threshold is reduced considerably as indicated by curve 42 of FIG. 3 of the drawing and thus the resulting narrowing of the band width is achieved at current densities considerably less than $10^4$ amperes per square centimeter as indicated by curve 44 of FIG. 4.

It was stated hereinabove that the side surfaces 26 and 28 could be optically flat and mutually parallel. Under these conditions a mode should be produced between the side surfaces 26 and 28. It has been found that a mode is produced between the side surfaces 26 and 28 but the stimulated emission threshold for this mode, above which a rather intense light passes through the side surfaces 26 and 28, is considerably higher than even the threshold of prior injection lasers as indicated in curve 46 of FIG. 3 and curve 48 of FIG. 4. This higher threshold value is understandable since a large portion of the energy generated by the injected carriers is being applied to the favored mode between the end surfaces 22 and 24.

Additional embodiments of the injection laser of the present invention are illustrated in FIGS. 5–9 of the drawing.

In FIG. 5 there is shown a second embodiment of the injection laser of the present invention. This laser is similar to the laser of FIG. 1 but it has additionally provided a first and a second reflective film or coating 50 and 52 applied to the end surfaces 22 and 24. The coating 50 is made to transmit light therethrough in a range from one to ten percent of the incident light from the crystal 10 and to reflect the remaining light. The coating 52 is made to reflect as much light as possible. Of course, the coatings 50 and 52 should not be conductive coatings which would provide a short across the crystal and, therefore, a multiple dielectric layer, for example, would be preferred in the embodiment of FIG. 5. It can be readily seen that the addition of the reflective coatings tends to increase the Q of the resonant structure between the end surfaces 22 and 24.

FIG. 6 illustrates a third embodiment of the laser of the present invention wherein metallic reflective coatings 54 and 56 electrically insulated by suitable insulating strips 58 and 60, respectively, having an index of refraction preferably at least approximately equal to that of the crystal 10, are employed. The coating 54 is made so as to transmit a small percentage of the incident light and coating 56 is made to reflect substantially all the incident light. The injection laser embodiment of FIG. 6 provides a relatively high Q in much the same manner as does the laser of the second embodiment shown in FIG. 5.

Figure 7:
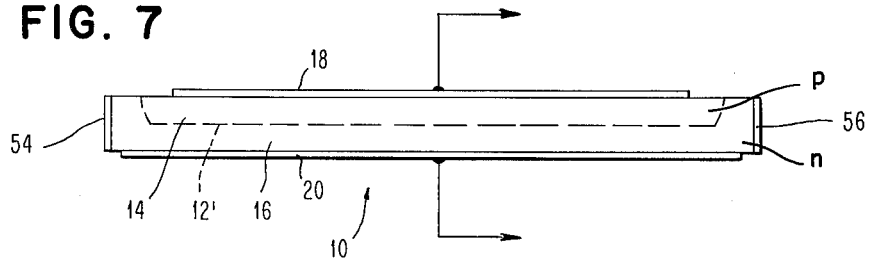

A fourth embodiment shown in FIG. 7 is similar to that of FIG. 6 except that a curved junction 12' is provided so that the ends are all of one conductivity type. This permits metallic reflective coatings 54 and 56 to be directly applied to the crystal without short-circuiting the p-n junction.

Figure 8:
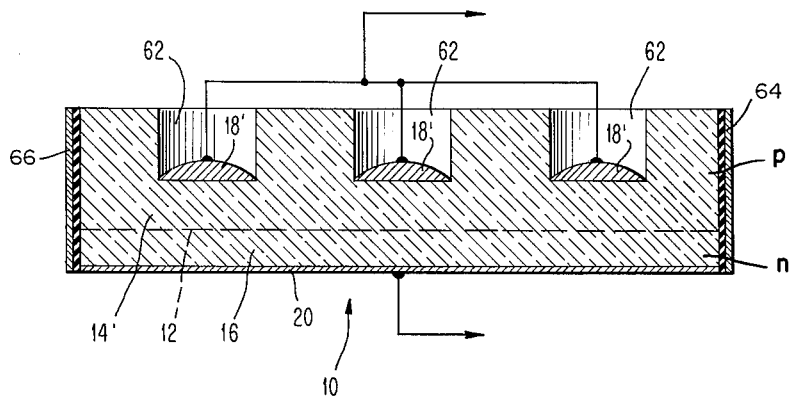

FIG. 8 illustrates an injection laser which is provided with a heat tank to aid in the maintenance of a low temperature in the crystal 10. This laser is provided with a "p" region 14' which has a plurality of recesses 62 at the lower end of which are connected electrodes 18' to the "p" region 14'. By this arrangement it can be seen that a large surface area is available for the dissipation of heat produced in the crystal while still maintaining a low series resistance between the electrodes 18' and 20. The resonant cavity in the embodiment is formed between the reflecting end surfaces 64 and 66.

A final embodiment is shown in FIG. 9 of the drawing wherein the reflective coating 52 of FIG. 5 is separated from coating 50 by a distance greater than the length of the crystal 10 by interposing a light transparent medium 64, preferably having an index of refraction at least approximately equal to that of the crystal 10, between the coating 52 and the crystal 10. By increasing the spacing between coatings 50 and 52 in this manner a more highly directional light beam is provided at the output of the injection laser.

It should be understood that where narrower output lines are desired the injection laser of the present invention may be operated at cryogenic temperatures, for example, the liquid nitrogen temperature.

While the invention has been particularly shown and described to preferred embodiments thereof, it will be understood by those skilled in the art that various changes, in form and details may be made therein without departing from the spirit and scope of the invention.

What is claimed is:
1. An injection laser comprising
a semiconductor crystal having a p region and an n region and a junction between said regions having a length substantially greater than its width;
a first electrode on the p region side of said crystal;
a second electrode on the n region side of said crystal;
means coupled to said electrodes for forward biasing said junction to produce stimulated emission of radiation in said crystal;
said first and second electrodes extending substantially over the entire length of said junction to forward bias said junction substantially over its entire length;
and means including said crystal forming an optical cavity resonant for said radiation traveling in the direction of the length of said junction.

2. A semiconductor laser comprising
a semiconductor crystal having upper and lower surfaces and a junction extending between said upper and lower surfaces essentially parallel to said surfaces;
said junction having a length substantially greater than its width;
first and second electrodes respectively disposed on said upper and lower surfaces;
means coupled to said electrodes for forward biasing said junction to produce stimulated emission of optical radiation in said crystal;
said electrodes extending lengthwise above and below said junction on said upper and lower surfaces for substantially the entire length of said junction to forward bias said junction substantially over its entire length;
and means including said crystal forming an optical cavity resonant for said radiation traveling in the direction of the length of said junction.

3. A semiconductor injection laser comprising a crystal of semiconductor material having end surfaces, side surfaces, and top and bottom surfaces;
the length of said crystal between said end surfaces being substantially greater than the width of said crystal between said side surfaces;
a p-n junction in said crystal extending between said end and side surfaces in a plane essentially parallel to said upper and lower surfaces;
said junction extending essentially over the entire length of said crystal between said end surfaces;
said end surfaces being mutually parallel and optically flat;
first and second electrodes respectively disposed on the upper and lower surfaces of said crystal;
and means coupled to said electrodes for forward biasing said junction to produce stimulated emission in said crystal;
each of said electrodes extending essentially over the entire length of the surface on which it is disposed to forward bias said junction substantially over its entire length.

4. The injection laser of claim 3 including reflective coatings on each of said end surfaces.

5. The injection laser of claim 4 wherein said reflective coatings are metallic and a layer of insulating material is provided between each of said coatings and said end surfaces.

6. The injection laser of claim 3 wherein said junction has curved end portions.

7. A semiconductor injection laser comprising
a crystal of semiconductor material having end surfaces, side surfaces, and top and bottom surfaces;
a p-n junction in said crystal extending in a plane essentially parallel to said upper and lower surfaces;
said junction having a length measured in a direction perpendicular to said end surfaces much greater than its width measured in a direction perpendicular to said side surfaces;
said end surfaces being mutually parallel and optically flat;
first and second electrodes respectively disposed on the upper and lower surfaces of said crystal;
and means coupled to said electrodes for forward biasing said junction to produce stimulated emission in said crystal;
said electrodes extending lengthwise above and below said junction on said upper and lower surfaces for substantially the entire length of said junction to forward bias said junction substantially over its entire length.

8. The injection laser of claim 7 wherein said junction extends to said end surfaces.

9. The injection laser of claim 7 wherein said junction is curved at its ends.

10. The injection laser of claim 7 wherein said junction extends only a portion of the distance between said end surfaces.

11. A semiconductor injection laser comprising
a crystal of semiconductor material having end surfaces, side surfaces, and top and bottom surfaces;
a p-n junction in said crystal extending in a plane essentially parallel to said upper and lower surfaces;
said junction having a length measured in a direction perpendicular to said end surfaces much greater than its width measured in a direction perpendicular to said side surfaces;
first electrode means connected to said crystal on one side of said p-n junction and second electrode means connected to said crystal on the other side of said p-n junction;
said first electrode means comprising at least two individual electrodes connected to separate portions of said crystal on one side of said junction;
said end surfaces being optically flat and mutually parallel;
and means coupled to said first and second electrode means for forward biasing said junction to produce stimulated emission in said crystal.

12. A semiconductor laser comprising
a crystal of semiconductor material;
said crystal having top and bottom surfaces and a semiconductor junction extending in said crystal essentially parallel to said upper and lower surfaces;
first electrode means connected to said crystal on one side of said junction and second electrode means connected to said crystal on the other side of said junction;

said first electrode means comprising at least two individual electrodes connected to separate portions of said crystal on one side of said junction;
and means coupled to said first and second electrode means for biasing said junction to produce stimulated emission in said crystal.

13. A semiconductor laser comprising
a crystal of semiconductor material;
said crystal having end surfaces, side surfaces, and top and bottom surfaces;
a stimulated emission junction in said crystal extending essentially parallel to said upper and lower surfaces between said end and side surfaces;
said end surfaces being mutually parallel and optically flat;
first and second electrode means disposed respectively to said upper and lower surfaces;
and means coupled to said first and second electrode means for forward biasing said junction to produce stimulated emission in said crystal;
said first and second electrode means on said upper and lower surfaces being essentially coextensive with said junction to bias the entire junction uniformly to produce stimulated emission along the entire junction.

14. The semiconductor laser of claim 13 wherein the length of said junction extending between said end surfaces is much greater than the width of said junction extending between said side surfaces.

15. The semiconductor laser of claim 13 wherein said junction is a p-n junction.

References Cited by the Examiner

UNITED STATES PATENTS

| | | | |
|---|---|---|---|
| 2,953,730 | 9/1960 | Pankove | 317—235 |
| 3,039,362 | 6/1962 | Dobrowolski | 88—106 |
| 3,055,257 | 9/1962 | Boyd et al. | 331—94.5 |
| 3,059,117 | 10/1962 | Boyle et al. | 88—61 |
| 3,064,167 | 11/1962 | Hoerni | 317—234 |
| 3,102,201 | 8/1963 | Braunstein et al. | 88—61 |

OTHER REFERENCES

Masters: "Coupling of Laser Rods," Proc. of the IRE, vol. 50, No. 2, pages 220 and 221, February 1962.

JEWELL H. PEDERSEN, *Primary Examiner.*

J. L. CHASKIN, *Assistant Examiner.*